United States Patent

Yu

Patent Number: 6,016,456
Date of Patent: Jan. 18, 2000

[54] SHIFT CONTROL METHOD FOR AUTOMATIC TRANSMISSIONS

[75] Inventor: Pyunghwan Yu, Kyungki-do, Rep. of Korea

[73] Assignee: Hyundai Motor Company, Seoul, Rep. of Korea

[21] Appl. No.: 08/992,577

[22] Filed: Dec. 17, 1997

[30] Foreign Application Priority Data

Dec. 17, 1996 [KR] Rep. of Korea ............ 96-66482

[51] Int. Cl.[7] ............................................. G06F 17/00
[52] U.S. Cl. ........................ 701/55; 701/51; 701/85; 475/128; 477/156; 477/161; 477/174
[58] Field of Search .................... 701/51, 52, 54, 701/55, 85; 477/144, 155, 156, 161, 166, 173, 174; 475/127, 128, 216, 296

[56] References Cited

U.S. PATENT DOCUMENTS

| | | | |
|---|---|---|---|
| 4,881,429 | 11/1989 | Kobayashi et al. | 477/138 |
| 4,970,916 | 11/1990 | Narita | 701/98 |
| 5,046,174 | 9/1991 | Lentz et al. | 701/60 |
| 5,455,767 | 10/1995 | Staerker | 701/55 |
| 5,468,198 | 11/1995 | Holbrook et al. | 477/143 |
| 5,520,586 | 5/1996 | Brown et al. | 475/120 |
| 5,612,874 | 3/1997 | Schulz et al. | 701/51 |
| 5,646,842 | 7/1997 | Schulz et al. | 701/51 |
| 5,725,454 | 3/1998 | Yasue et al. | 477/155 |

*Primary Examiner*—William A. Cuchlinski, Jr.
*Assistant Examiner*—Gertrude Arthur

[57] ABSTRACT

Disclosed is a shift control method for automatic transmissions. The shift control method includes the steps of determining if all conditions for performing closed-throttle upshifting are met after information of whether a vehicle is in a driving state is read; establishing an initial duty value, first and second ramps for performing duty control, and duty signal output times, all from a closed-throttle upshifting map data, and determining a duty compensating value from a hydraulic pressure compensating map table; adding the initial duty value and duty compensating value to calculate an initial duty control value, and outputting the initial duty control value as ramps to perform shifting; subtracting engine RPM from turbine RPM and determining whether the resulting value is equal to or less than a predetermined critical value in a state where shifting is being performed using the initial duty control value; adding a predetermined compensating duty value to the initial duty control value to increase duty control, then performing duty control to the determined ramps and shifting to a target shift range; determining if the conditions for open-throttle upshifting are met; determining if upshifting is completed; determining if a final duty control hold time has exceeded a critical hold time; and setting the duty value to "0" to maintain the present state of reacting and friction elements.

5 Claims, 3 Drawing Sheets

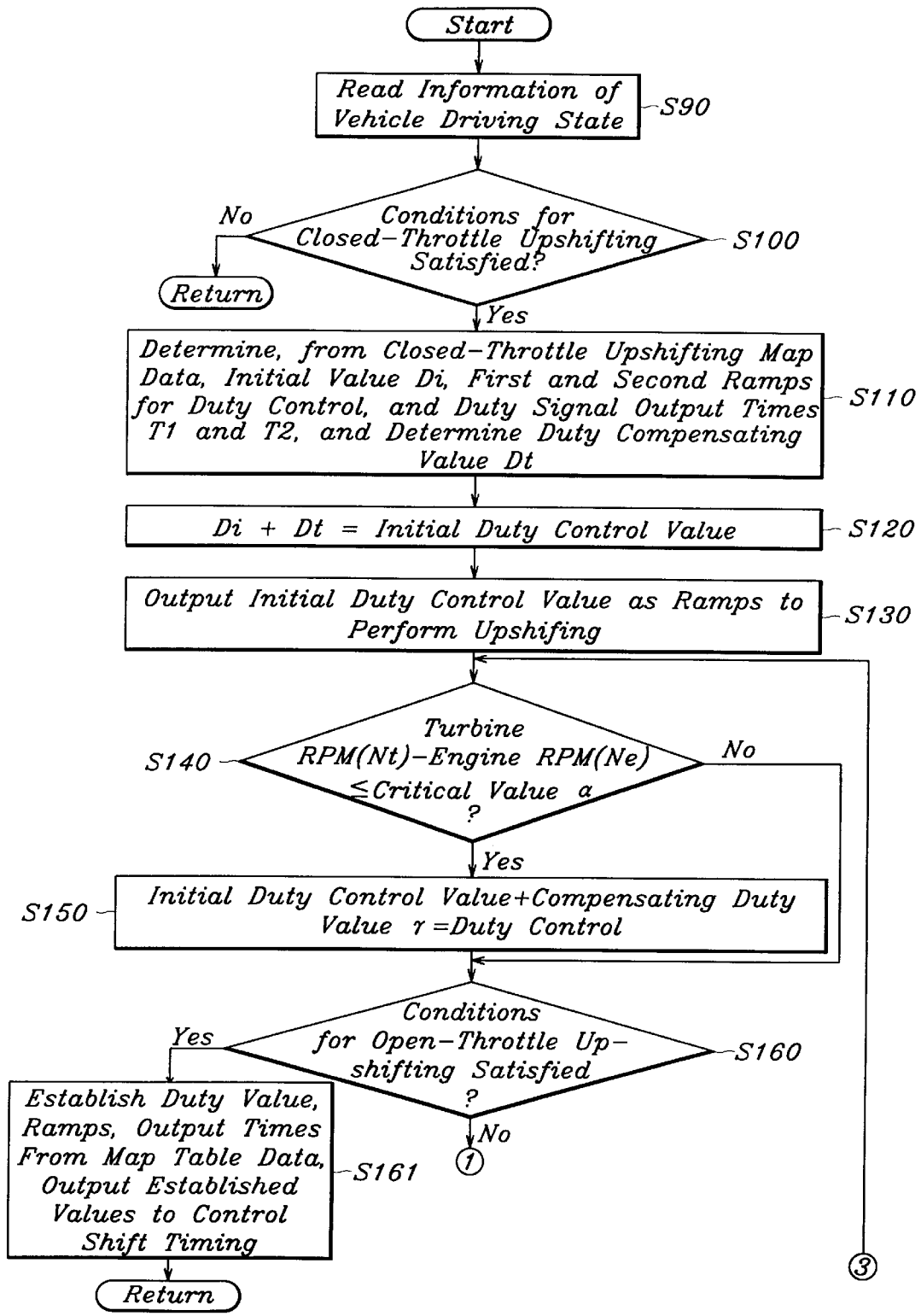

SHIFT CONTROL METHOD FOR AUTOMATIC TRANSMISSIONS

FIELD OF THE INVENTION

The present invention relates to a shift control method for automatic transmissions, and more particularly, to a shift control method for automatic transmissions which, during closed-throttle upshifting, prevents the occurrence of shift shock by adjusting duty control.

BACKGROUND OF THE INVENTION

In automatic transmissions, closed-throttle upshifting is performed when the driver releases the accelerator pedal in a mid to high-speed driving state (closed-throttle downshifting occurs as the vehicle slows down on closed throttle). In the prior art, duty is controlled in two stages during closed-throttle upshifting. This can be illustrated as two distinct "ramps" on a graph.

However, shifting is not realized at predetermined gear meshing points nor at a point where the duty control value is "0" as a result of various mechanical and hydraulic pressure control errors. As a result, shift shock occurs by the difference in engine RPM and turbine RPM.

Further, it is possible for hydraulic pressure, operating to perform the upshifting, to be excessively raised such that shifting is forcefully realized before the predetermined gear meshing points. This also results in shift shock caused by the difference in engine RPM and turbine RPM.

SUMMARY OF THE INVENTION

The present invention has been made in an effort to solve the above problems.

It is an object of the present invention to provide a shift control method for automatic transmissions which, when all conditions for closed-throttle upshifting are satisfied, compensates output duty values to suitably control gear-meshing timing according to engine RPM and turbine RPM such that forced shifting is prevented and shift timing is suitably controlled.

To achieve the above object, the present invention provides a shift control method for automatic transmissions comprising the steps of determining if all conditions for performing closed-throttle upshifting are met after information of whether a vehicle is in a driving state is read; establishing, if the conditions for closed-throttle upshifting are met, an initial duty value, first and second ramps for performing duty control, and duty signal output times, all from a closed-throttle upshifting map data, and determining a duty compensating value from a hydraulic pressure compensating map table; adding the initial duty value and duty compensating value to calculate an initial duty control value, and outputting the initial duty control value as ramps to perform shifting; subtracting engine RPM from turbine RPM and determining whether the resulting value is equal to or less than a predetermined critical value in a state where shifting is being performed using the initial duty control value; adding, if the value resulting from the subtraction of engine RPM from turbine RPM is equal to or less than the critical value, a predetermined compensating duty value to the initial duty control value to increase duty control, then performing duty control to the determined ramps and shifting to a target shift range; determining if the conditions for open-throttle upshifting are met; determining if upshifting is completed if the conditions for open-throttle upshifting are not met; determining, if it is determined that upshifting is completed, if a final duty control hold time, output to set shift timing, has exceeded a critical hold time; and setting the duty value to "0" to maintain the present state of reacting and friction elements.

If all conditions for performing closed-throttle upshifting are not met after information of whether a vehicle is in a driving state is read, normal shifting is performed based on map table data using throttle valve opening and vehicle speed information.

If it is determined that conditions for open-throttle upshifting are met after the compensating duty value is added to the initial duty control value, shift control operations for closed-throttle upshifting are discontinued, then the duty value, ramps, and output times are established for controlling shifting to the target shift range from the map table data, and the established values are output to control shift timing into a target shift range.

The shift control method of the present invention further comprises the steps of determining, if it is determined that upshifting is not completed, if a presently-output duty control signal delay time exceeds the sum of the duty signal output time and a compensating time to determine if a first ramp end point has been reached; subtracting, if it is determined that the first ramp end point has been reached, a compensating duty value from the duty control signal delay time to calculate a second duty control, and outputting the duty control such that gear meshing to the target shift range is continuously maintained; performing, in a state where gear meshing to the target shift range is maintained, control of the first and second ramps, and determining if the delay time of the duty control signal has reached the shift completion point; and setting, if it is determined that the delay time of the duty control signal has been reached, the duty value to "0" to maintain the present state of reacting and friction elements.

If the delay time of the duty control signal has not been reached, control is returned to subtracting engine RPM are from turbine RPM to determine whether the resulting value is equal to or less than a predetermined critical value to regulate duty control for closed-throttle upshifting control.

BRIEF DESCRIPTION OF THE DRAWINGS

Further objects and other advantages of the present invention will become apparent from the following description in conjunction with the attached drawings, in which:

FIGS. 2A and 2B are a flow chart illustrating a shift control method for automatic transmissions according to a preferred embodiment of the present invention.

DETAILED DESCRIPTION OF THE PREFERRED EMBODIMENTS

Preferred embodiments of the present invention will now be described in detail with reference to the accompanying drawings.

Figure 1:
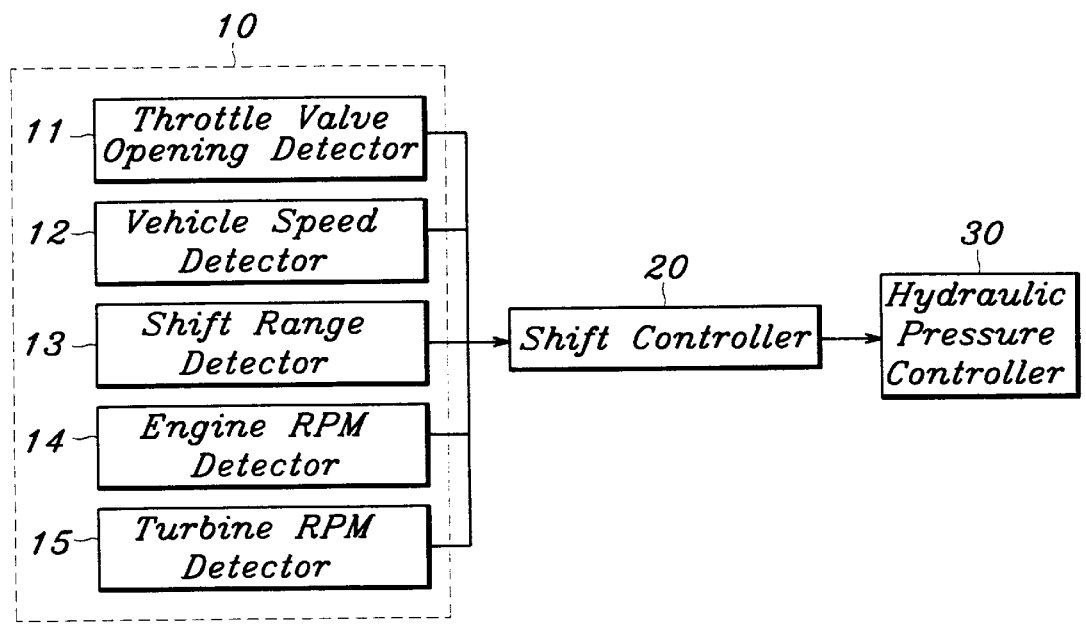
FIG. 1 is a block diagram illustrating a shift control system for automatic transmissions according to a preferred embodiment of the present invention.
Figure 3:
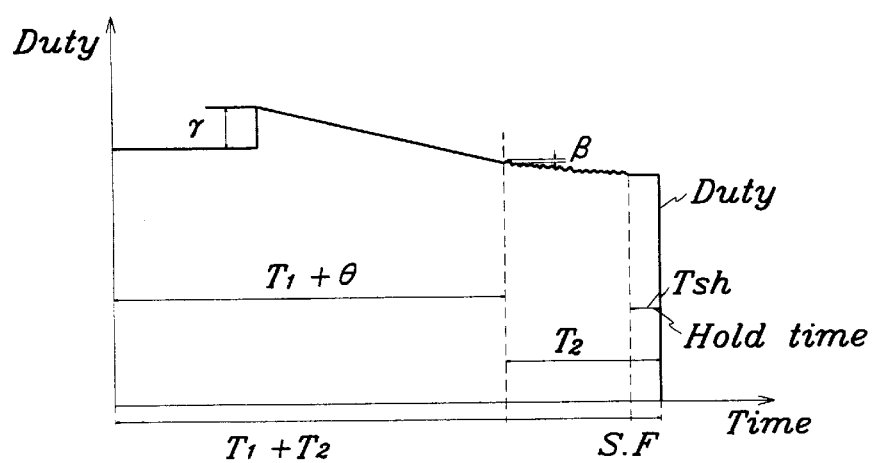
FIG. 3 is a graph illustrating the relation between duty control and time when closed-throttle upshifting according to a preferred embodiment of the present invention.

Referring to FIG. 1, the inventive shift control system comprises a detecting portion 10 for detecting throttle valve opening, vehicle speed, shift range, engine RPM, and turbine RPM, and outputting corresponding electric signals; a shift controller 20 for facilitating the execution of general operations to control shift timing into a shift range determined using a map data program, the map data program utilizing the signals input from the detecting portion 10; and a hydraulic pressure controller 30 for controlling hydraulic pressure, supplied to friction elements and reacting elements, into duty pressure to enable shifting into the target shift range according to duty control signals input from the shift controller 20.

The detecting portion 10 comprises a throttle valve opening detector 11 for detecting an opening degree of a throttle valve, the throttle valve being indexed with an accelerator pedal; a vehicle speed detector 12 for detecting vehicle speed; a shift range detector 13 for detecting present shift range, the shift range varying according to vehicle speed and throttle opening; an engine RPM detector 14 for detecting rotational speed of an engine crankshaft; and a turbine RPM detector 15 for detecting rotational speed of a turbine, the output member of a fluid torque converter.

Figure 2B:
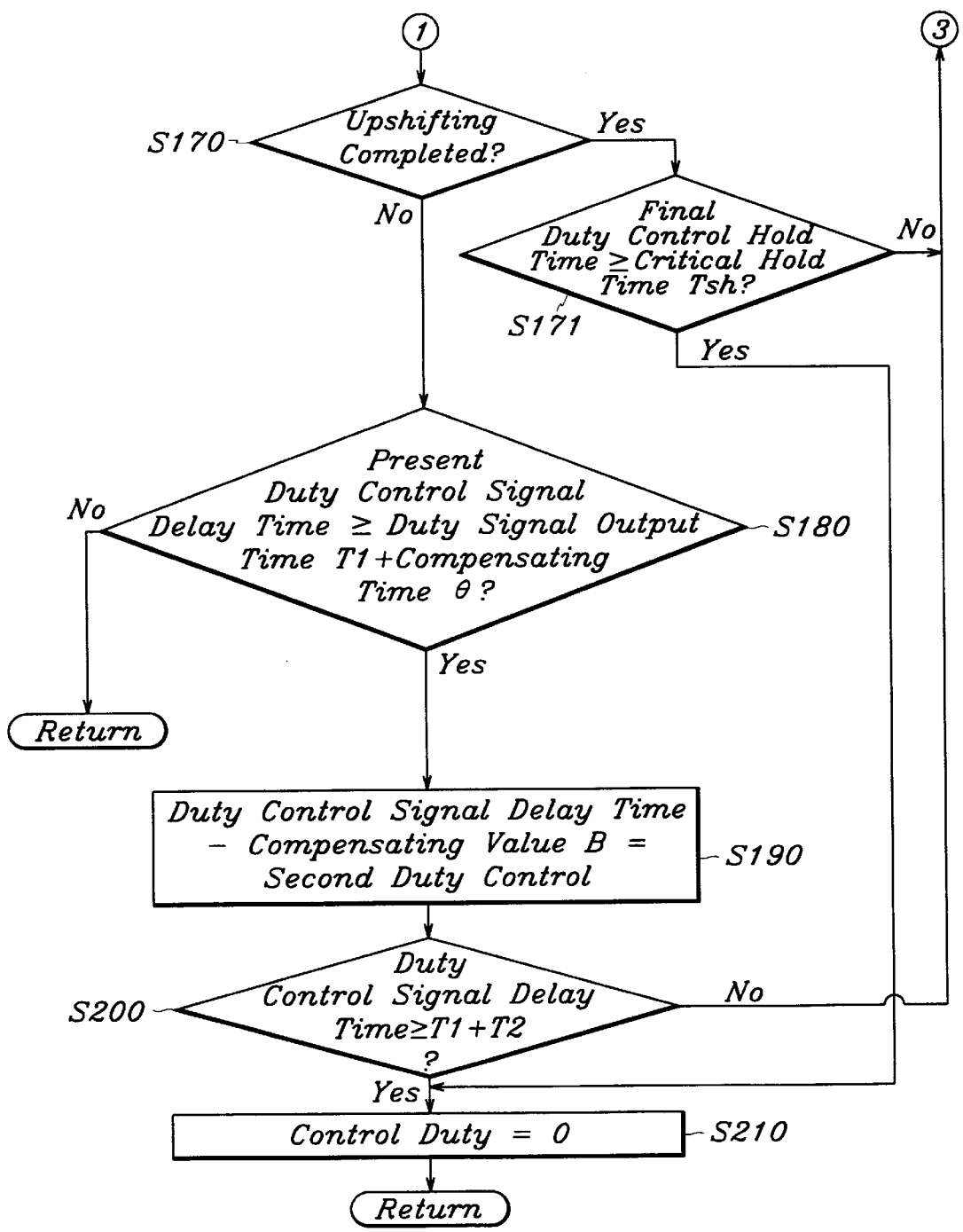

The operation of the shift control system for automatic transmissions structured as in the above will now be described with reference to the flow chart of FIGS. 2A and 2B.

In the drawing, information of whether the vehicle is in a driving state is first read S90. Next, the shift controller 20, using information output from the detecting portion 10, determines if conditions for open-throttle upshifting are met S160.

If these conditions are not met, the shift controller 20 performs normal shifting based on map table data using throttle valve opening and vehicle speed information. However, if the conditions for closed-throttle upshifting are satisfied, the shift controller 20 first determines, from the closed-throttle upshifting map data, an initial duty value Di, first and second ramps for performing duty control, and duty signal output times T1 and T2, then determines a duty compensating value DT from a hydraulic pressure compensating map table S110.

After the initial duty value Di and duty compensating value DT are determined as in the above, the two values Di and DT are added together to calculate an initial duty control value S120.

Next, after the ramps for duty control are calculated through the above process, the shift controller 20 outputs the initial duty control value, calculated in step 120, as ramps to the hydraulic pressure controller 30 such that the appropriate upshifting is performed S130.

In a state where closed-throttle upshifting is being performed through the above operations, the shift controller 20 subtracts engine RPM (Ne) from turbine RPM (Nt) and determines whether the resulting value is equal to or less than a predetermined critical value ($\alpha$) S140.

In the above, if the value resulting from the subtraction of engine RPM (Ne) from turbine RPM (Nt) is equal to or less than the critical value ($\alpha$), a predetermined compensating duty value $\gamma$ is added to the initial duty control value calculated in step S120 to increase duty control, then duty control is performed to the determined ramps and shifting is performed to the target shift range S150.

Next, the shift controller 20, using information output from the detecting portion 10, determines if conditions for open-throttle upshifting are met S160. If they are, the shift control operations for closed-throttle upshifting are discontinued, then the duty value, ramps, and output times are established for controlling shifting to the target shift range from the map table data, determined according to throttle opening and vehicle speed detected in the open-throttle state. Also, the established values are output to the hydraulic pressure controller 30 to a gear meshing operation to control shift timing into the target shift range S161.

If the conditions for open-throttle upshifting are not met in step S160, it is determined if upshifting is completed S170. If it is determined that upshifting is completed in step S170, the shift controller 20 determines whether a final duty control hold time, output to set shift timing, has exceeded a critical hold time (Tsh) S171.

If the final duty control hold time has not exceeded the critical hold time (Tsh), shift control is returned to step S140 to regulate duty control for closed-throttle upshifting control, and if the critical hold time (Tsh) has been exceeded by the final duty control hold time, it is determined that shift timing control for the target shift range for closed-throttle upshifting is completed and the duty value is set to "0" to maintain the present state of the reacting elements and friction elements S210.

In step 170, if it is determined that upshifting is not completed, the shift controller 20 determines if a presently-output duty control signal delay time exceeds the sum of the duty signal output time T1 and a compensating time $\theta$ to determine if a first ramp end point (i.e., a shift starting point) has been reached S180.

In step S180, if it is determined that the first ramp end point has been reached, the shift controller 20 subtracts a compensating duty value $\beta$ from the duty control signal delay time to calculate a second duty control, and outputs the duty control to the hydraulic pressure controller 30 such that gear meshing to the target shift range is continuously maintained S190.

In a state where gear meshing to the target shift range is maintained, the shift controller 20 performs control of the first and second ramps, and determines if the delay time of the duty control signal has reached the shift completion point S200.

If it is determined that the delay time of the duty control signal has been reached in step S200, the shift controller 20 determines if shift timing of the target shift range is completed, then sets the output duty control to "0" to stably maintain control pressure S210.

In step S200, if the delay time of the duty control signal has not been reached, control is returned to step S140 where engine RPM (Ne) are subtracted from turbine RPM (Nt) to determine whether the resulting value is equal to or less than a predetermined critical value ($\alpha$).

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. A shift control method for automatic transmissions comprising the steps of:

determining if all conditions for performing closed-throttle upshifting are met after information of whether a vehicle is in a driving state is read;

establishing, if the conditions for closed-throttle upshifting are met, an initial duty value, first and second ramps for performing duty control, and duty signal output times, all from a closed-throttle upshifting map data, and determining a duty compensating value from a hydraulic pressure compensating map table;

adding the initial duty value and duty compensating value to calculate an initial duty control value, and outputting the initial duty control value as ramps to perform shifting;

subtracting engine RPM from turbine RPM and determining whether the resulting value is equal to or less than a predetermined critical value in a state where shifting is being performed using the initial duty control value;

adding, if the value resulting from the subtraction of engine RPM from turbine RPM is equal to or less than the critical value, a predetermined compensating duty value to the initial duty control value to increase duty control, then performing duty control to the determined ramps and shifting to a target shift range;

determining if the conditions for open-throttle upshifting are met;

determining if upshifting is completed if the conditions for open-throttle upshifting are not met;

determining, if it is determined that upshifting is completed, if a final duty control hold time, output to set shift timing, has exceeded a critical hold time; and setting the duty value to "0" to maintain the present state of reacting and friction elements.

2. The shift control method of claim 1, wherein if all conditions for performing closed-throttle upshifting are not met after information of whether a vehicle is in a driving state is read, normal shifting is performed based on map table data using throttle valve opening and vehicle speed information.

3. The shift control method of claim 1, wherein if it is determined that conditions for open-throttle upshifting are met after the compensating duty value is added to the initial duty control value, shift control operations for closed-throttle upshifting are discontinued, then the duty value, ramps, and output times are established for controlling shifting to the target shift range from the map table data, and the established values are output to control shift timing into a target shift range.

4. The shift control method of claim 1, further comprising the steps of:

determining, if it is determined that upshifting is not completed, if a presently-output duty control signal delay time exceeds the sum of the duty signal output time and a compensating time to determine if a first ramp end point has been reached;

subtracting, if it is determined that the first ramp end point has been reached, a compensating duty value from the duty control signal delay time to calculate a second duty control, and outputting the duty control such that gear meshing to the target shift range is continuously maintained;

performing, in a state where gear meshing to the target shift range is maintained, control of the first and second ramps, and determining if the delay time of the duty control signal has reached the shift completion point; and setting, if it is determined that the delay time of the duty control signal has been reached, the duty value to "0" to maintain the present state of reacting and friction elements.

5. The shift control method of claim 4, wherein if the delay time of the duty control signal has not been reached, control is returned to subtracting engine RPM are from turbine RPM to determine whether the resulting value is equal to or less than a predetermined critical value to regulate duty control for closed-throttle upshifting control.

* * * * *